April 11, 1939.  G. LINSTEAD ET AL  2,153,946
FOLDABLE STEP
Filed June 18, 1937  2 Sheets-Sheet 1
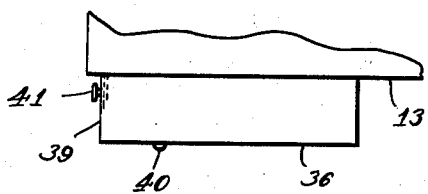
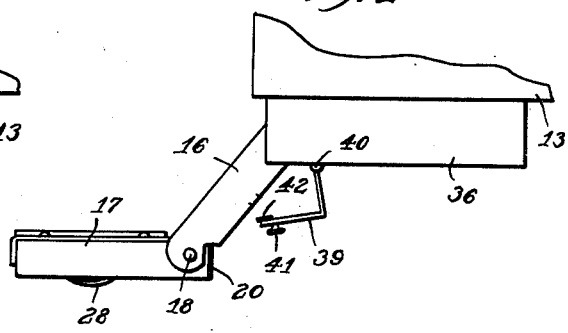
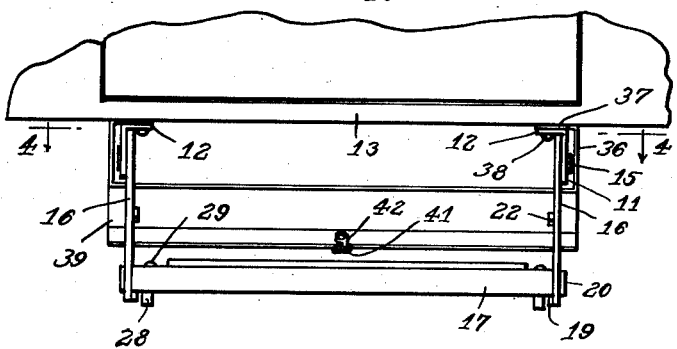
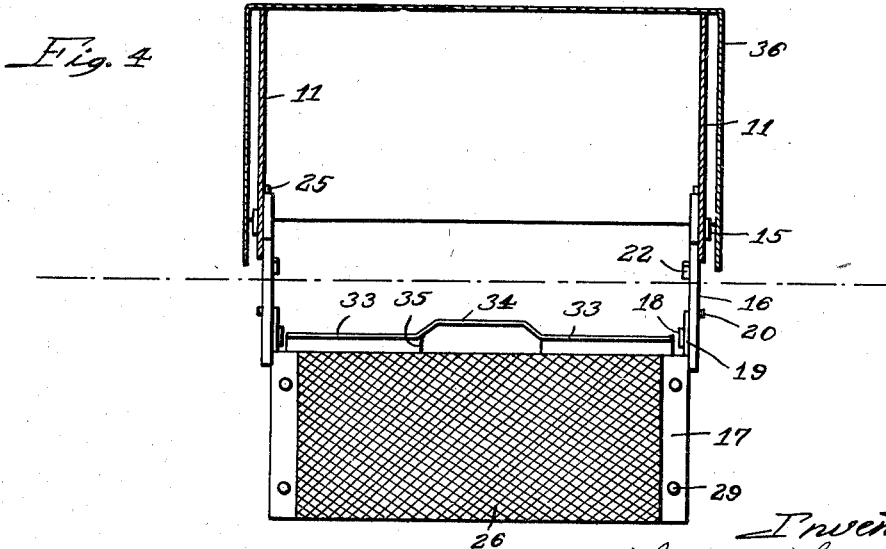

April 11, 1939. G. LINSTEAD ET AL 2,153,946
FOLDABLE STEP
Filed June 18, 1937 2 Sheets-Sheet 2
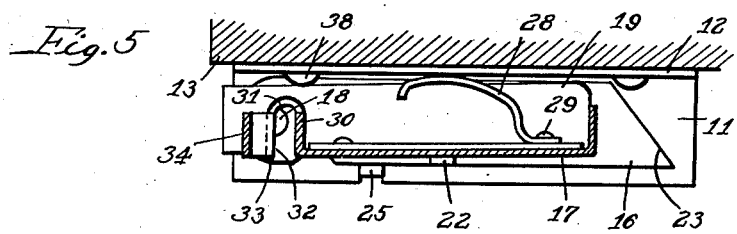
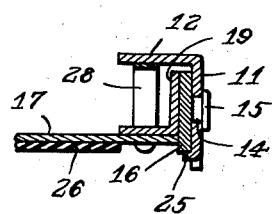
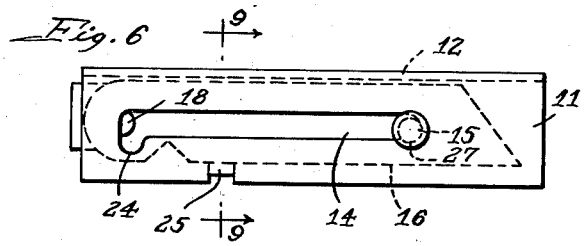
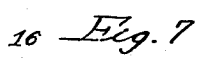
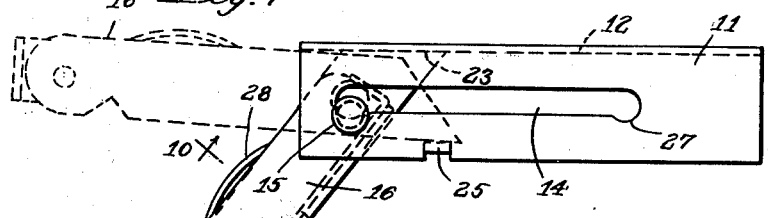
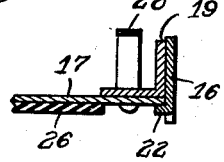
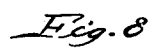
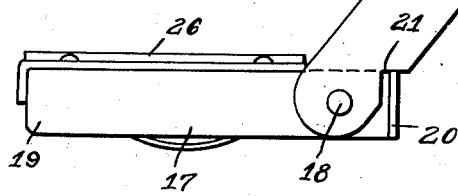
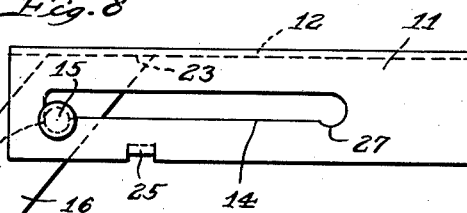

Patented Apr. 11, 1939

2,153,946

UNITED STATES PATENT OFFICE 2,153,946

FOLDABLE STEP

Gilbert Linstead and Charles R. Polstra, Rockford, Ill., assignors to The Atwood Vacuum Machine Company, Rockford, Ill., a co-partnership composed of Seth B. Atwood and James T. Atwood Application June 18, 1937, Serial No. 148,884

21 Claims. (Cl. 280—166)

This invention relates to foldable steps generally but is particularly concerned with one especially designed and adapted for use on automobile trailers.

The principal object of our invention is to provide a step in which the tread folds into the plane of the two supporting arms which in turn are pivotally and slidably mounted on and between a pair of longitudinally slotted brackets so that the folded assembly can be moved to a retracted position under the floor of the trailer and will take up very little space and accordingly give ample road clearance therebeneath. Many other steps with which we are familiar have been objectionable because of the extent to which they project downwardly from the trailer floor in folded position, thus giving rise to the danger of striking obstructions when the trailer is being parked. Our step by reason of its folding to such compact size avoids this objection and it furthermore makes it feasible to provide a protective sheet metal casing therefor to keep it clean when folded away.

Another important object of our invention consists in providing a foldable step of the kind mentioned designed so that it may be constructed throughout from sheet metal and will, therefore, be of light weight and also economical to manufacture. All of the sheet metal parts are formed with a special view to obtaining the requisite strength and rigidity, and a novel feature of the sheet metal tread is the way in which one edge thereof is formed to provide upstanding flanges adapted to serve as mud scrapers as well as a convenient handle between the scrapers adapted for use in pulling out the step from its retracted position and also in folding the step.

Other important features of the step of our invention are the novel way in which the supporting arms inter-lock with the ends of the slots in the brackets to hold the step firmly in extended operative position and the way in which these arms also inter-lock with the other ends of the slots when the step is folded, so as to insure keeping the step in retracted position, there being spring means also provided for yieldably holding the parts in folded position both to prevent accidental unfolding and eliminate play and rattle when the trailer is in motion.

A further feature worthy of mention is the provision of lugs on the slotted brackets which cooperate with the ends of the supporting arms in unlocking the arms from the outer off-set ends of the slots in the folding of the step, and thereafter serve also to support the folded step in the plane of the brackets by abutment with the edges of the arms in their folded position.

The invention is illustrated in the accompanying drawings in which—

Figures 1 and 2 are side views of the step made in accordance with our invention, Fig. 1 showing the container therefor closed with the folded step inside as when the trailer is ready for the road and Fig. 2 showing the container open with the step extending therefrom in operative position;

Fig. 3 is a front view of Fig. 2;

Fig. 4 is a horizontal section on the line 4—4 of Fig. 3 looking down on the step;

Fig. 5 is a longitudinal section through the folded step omitting the container;

Fig. 6 is a side view of the folded step without the container;

Fig. 7 is a view similar to Fig. 6 but showing in full lines the first phase in the unfolding of the step and in dotted lines the last phase in the folding of the step;

Fig. 8 is a view similar to Fig. 7 but showing the step fully unfolded; and

Figs. 9 and 10 are sectional details on the lines 9—9 and 10—10 of Figs. 6 and 7, respectively.

The same reference numerals are applied to corresponding parts throughout the views.

There are two brackets 11 of sheet metal bent to L-shaped cross-section whereby to provide flanges 12 for bolting or otherwise suitably securing the foldable step to the floor 13 of the trailer or other vehicle on which the step is to be used. Naturally since this step may be used elsewhere than on vehicles, as for example, a foldable step in shoe stores, grocery stores, and other places where merchandise is kept on shelves and racks necessitating step ladders, the support 13 it will be understood should be looked upon as any suitable support wherever a foldable step like the one herein disclosed may be found usable. The brackets 11 have longitudinal slots 14 therein in which studs 15 projecting from the two arms 16 are slidably and pivotably received. The arms 16 carry a tread or step 17 that is pivotally connected to the arms by rivets 18. The tread 17 like the arms 16 is formed from sheet metal but if desired it may be made of wood or other material, so long as it has on its opposite sides the means for pivotally connecting the same to the arms 16 at 18. In the present case these are sheet metal strips 19 of angular cross-section riveted to the ends of the tread 17 which project forwardly from the tread and have the front ends thereof bent outwardly at right angles as at 20 to provide shoulders for engagement in the notches 21 on the arms 16 in spaced relation to the pivots 18, whereby to support the tread 17 in a predetermined angular relation to the arms 16 when the step is unfolded for use as in Fig. 8. The tread 17 can be swung in a clock-wise direction from the position of Fig. 8 through about 120 degrees into the plane of the arms 16 as shown in Fig. 7, when it strikes lugs 22 bent inwardly from the lower edge of the arms 16, thus preventing further movement of the tread 17 and supporting it in the folded position. Now, it will be observed that the upper ends of the arms 16 are cut off at an angle as at 23 to come substantially horizontal when the step is unfolded as in Fig. 8, and to have abutment with the bottom of the flanges 12 of the brackets 11 whereby to support the step in its unfolded position partly by the studs 15 and partly by the flanges 12 where the ends 23 of the arms 16 engage. There is a downward off-set 24 in the front end of each of the slots 14 and the studs 15 enter these off-sets when the step is unfolded for use, thereby positively locking the step in its operative position. However, in the folding of the step, after the tread 17 is folded in between the arms 16 as in Fig. 7 and the arms are swung upwardly into the horizontal plane of the brackets 11 as indicated in dotted lines in Fig. 7, the upper ends of the arms 16 strike lugs 25 bent inwardly from the lower edges of the brackets 11 thereby lifting the studs 15 out of the off-set ends 24 of the slots 14 and permitting the arms 16 with the tread 17 folded therebetween to be slid inwardly to the retracted position shown in Fig. 6. The lugs 25 slidably support the arms 16 in this operation and later serve to support the assembly in retracted position. It is obvious that the unfolding of the step for use and the folding of the step away in retracted position can be accomplished so easily that any one, even a child, can easily operate it. Furthermore, when the step is unfolded it is perfectly rigid and fool-proof and can not shift its position accidentally and thus give rise to possible injury to one stepping on or off the same. The load imposed on the tread 17 is assumed in such a way by the arms 16 and brackets 11 that there is no danger of the step giving way even under the combined weight of several persons, let alone the weight of one heavy person. The tread surface on the tread 17 is herein shown as provided with a rubber mat 26 for anti-skid purposes but it should be understood that where sheet metal is employed in the construction of the tread member, suitable upstanding projections may be struck from the sheet metal itself, in an ornamental design if desired, for a similar purpose.

The inner ends 27 of the slots 14 are also off-set downwardly but preferably to a lesser degree than the outer ends 24 whereby to receive the studs 15 when the arms 16 with the tread 17 folded therebetween are slid inwardly between the brackets 11 to the retracted position shown in Fig. 6. This necessitates a deliberate pull on the folded step to move it from retracted position and it is therefore less apt to drift out when the trailer is in motion and the assembly is subjected to the usual amount of jostling to and fro. We prefer, however, not to rely entirely upon these off-set ends 27 to keep the folded step in retracted position but provide a pair of leaf springs 28, one on each of the end pieces 19 on the tread 17 and suitably secured by the same rivets 29 that fasten the pieces 19 to the tread, as shown in Figs. 5 and 9. These leaf springs 28 come into frictional engagement with the flanges 12 of the brackets 11 when the folded step is slid inwardly to retracted position, and there is sufficient deflection of the springs by the flanges which is not entirely relieved by the dropping of the studs 15 into the off-sets 27, so that the parts are kept under a certain spring tension resisting upward movement of the studs 15 out of the off-set ends 27 of the slots. In that way, it is obvious that the folding step is held more securely in retracted position and there is moreover no chance for play between the parts, and rattle, that would otherwise be noticeable when the trailer is in motion, is eliminated.

The tread 17 as clearly appears in Figs. 4 and 5 has its front edge bent downwardly as at 30, forwardly as at 31 and then upwardly again as at 32 to provide two scraping edges 33 along opposite ends of the tread at the front thereof. A handle 34 is formed integral with the flange 32 on which the scraping edges 33 are provided, the metal being cut away below the handle as indicated at 35 in Fig. 4 whereby to permit the fingers to be extended through the opening for a better grip on the handle. When the folded step is in retracted position as in Fig. 5 the handle 34 is extending outwardly from the outer end of the folded assembly where it can be easily grasped. In that position the scraping edges 33 project downwardly and hence any dirt caught behind the scraping edges and in front of the tread 17 while the step was in use is obviously given ample opportunity to drop out both during the folding operation and while the folded step is being slid away to retracted position. It is obvious what an advantage such scraping edges are in a device of this kind, bearing in mind the fact that trailers are frequently taken to camp sites where the facilities for parking are such that there is no avoiding getting the shoes muddy and, unless facilities like this are provided for cleaning the mud off before entering the trailer it becomes impossible to keep the trailer in a clean livable condition.

The foldable step just described is a complete unit and will in most cases be sold in that form. However, for the more fastidious who desire deluxe equipment we provide a sheet metal container 36 closed on all sides but the front and top and having in-turned flanges 37 on the opposite ends thereof as shown in Fig. 3 adapted to be entered between the floor 13 and the flanges 12 of the brackets 11 so as to be secured in place when the brackets are fastened to the floor, the bolts indicated at 38 in Fig. 3 being arranged to pass through registering holes in the flanges 12 and 37. The container 36 is large enough to accommodate the complete foldable step assembly in the condition illustrated in Fig. 6, and it has a door 39 hinged to the bottom thereof as at 40 and equipped with a knob 41 and latch 42, whereby after the step has been folded and slid away to retracted position the door 39 can be closed and locked as illustrated in Fig. 1. The step is, therefore, fully enclosed and protected against collection of road dirt thereon. In that way there is no need for cleaning off the step before it can be used.

It is believed the foregoing description conveys a good understanding of the objects and advantages of our invention. The appended claims have been drawn with a view to covering all legitimate modifications and adaptations.

We claim:

1. A shiftable step comprising a pair of upright guiding and supporting brackets, each having a longitudinally extending, substantially horizontal guideway provided thereon, a step comprising a tread and opposed supporting arms on the ends thereof, a single pivot for the upper end of each of the arms each slidably supported in one of said guideways, said pivots being spaced from the upper ends of said arms and, besides permitting swinging movement of the arms and step bodily to and from substantially horizontal retracted position between the aforesaid brackets, providing part of the support for the step in its extended operative position at the front end of the guideways and also providing part of the support for the step in its retractive inoperative position, said pivots in the latter position of the step being disposed in the rear ends of said guideways, one or more projections on the front ends of said brackets for engagement with the upper ends of said arms serving by cooperation with the arms and the aforesaid pivots to provide two spaced points of support for each arm to support the step rigidly in operative position, and one or more other projections on said brackets downwardly spaced relative to the first-mentioned projections for engagement with the bottoms of said arms to serve by cooperation with the arms and the aforesaid pivots to provide two spaced points of support for each arm to support the step in retractive inoperative position.

2. A shiftable step comprising a pair of upright elongated, longitudinally slotted, sheet metal guiding and supporting brackets, each of the slots providing a longitudinally extending, substantially horizontal guideway, a step comprising a tread and opposed supporting arms on the ends thereof, pivots on and spaced from the upper extremities of the arms slidably supported in said guideways, a projection rigid with at least one of said brackets arranged to be engaged by the upper extremity of the related one of said arms when the pivots are in the front ends of the slot guideways, whereby to support the step rigidly in relation to the brackets in extended operative position, and another projection rigid with at least one of the brackets arranged to be engaged by the lower end of the related one of said arms when the pivots are in the rear ends of the slot guideways, whereby to support the step substantially in the plane of said brackets in inoperative retracted position.

3. A device of the character described comprising two parallel, laterally spaced, elongated sheet metal brackets, each having a longitudinal slot provided therein, and a horizontal tread member having two parallel sheet metal arms on the opposite ends thereof extending in angular relation thereto in substantially vertical planes, said arms being disposed between and adjacent said brackets, studs on said arms entered freely through said slots and securing said arms to said brackets for sliding and pivotal movement relative thereto, means in rigid relation with the brackets providing substantially horizontal supporting surfaces at the tops thereof, the upper ends of said arms having substantially horizontal edges in spaced relation to said studs for supporting engagement with said supporting surfaces when the tread is horizontally disposed in operative position with the studs at one end of the slots, and an inward projection on at least one of the brackets below the slot therein for engagement with the back of the adjacent arm when the tread is in out-of-the-way position with the studs in the other ends of the slots.

4. A device of the character described comprising two parallel laterally spaced elongated sheet metal brackets each having a longitudinal slot provided therein, two parallel sheet metal arms disposed between and adjacent said brackets having studs thereon entered freely through said slots securing the same to the brackets for sliding and pivotal movement relative thereto, a tread member pivotally mounted at opposite ends on the outer ends of said arms for swinging movement from a position in substantially co-planar relation with the arms and substantially wholly therebetween to an operative position extending in angular relation to said arms, means in rigid relation with the brackets providing substantially horizontal supporting surfaces at the tops thereof, the inner ends of said arms having substantially horizontal edges in spaced relation to the studs for supporting engagement with said supporting surfaces when the arms are extended from the brackets in operative position with the studs at the outer end of the slots, and a projection on at least one of the brackets below the slot therein for engagement under the adjacent arm when the arms and tread member are in an out-of-the-way position with the studs in the inner ends of the slots.

5. A device as set forth in claim 4 wherein the outer end of at least one of the slots in said brackets is offset downwardly to provide a recess for locking engagement of the stud therein when the arms are disposed in operative position, the last mentioned projection being in such spaced relation to the offset end of the slot so that the arm will engage the projection in the folding of the arm into the plane of the bracket and will lift the stud out of the offset end of the slot and into alignment with the rest of the slot.

6. A device as set forth in claim 2 wherein the outer end of at least one of the slots in said brackets is offset downwardly to provide a recess for locking engagement of the pivot therein when the arms are disposed in operative position, the last mentioned projection being in such spaced relation to the offset end of the slot so that the arm will engage the projection in the folding of the arm into the plane of the bracket and will lift the pivot out of the offset end of the slot and into alignment with the rest of the slot.

7. A foldable step comprising a pair of upright guiding and supporting brackets, each having a longitudinally extending, substantially horizontal guideway provided thereon, a step comprising a tread and opposed supporting arms spaced from the ends thereof, pivots on the upper ends of the arms slidably supported in said guideways, said pivots providing part of the support for the step in its unfolded operative position at the front end of the guideways and also serving to support the step in its folded inoperative position, said pivots in the latter position of the step being disposed in the rear ends of said guideways, the upper ends of said arms being both at a predetermined angle to determine the angle of suspension of the arms in operative position, and means engaged by the angular upper ends of said arms when the pivots are in the front ends of the guideways, whereby to support the step rigidly in relation to the brackets in operative position, the front ends of said guideways being offset downwardly and the pivots on the upper ends of the arms being arranged to engage in said offset ends to lock the step detachably in operative position with the angular upper ends engaging said supporting means.

8. A foldable step comprising a pair of upright guiding and supporting brackets, each having a longitudinally extending, substantially horizontal guideway provided thereon, a step comprising a tread and opposed supporting arms on the ends thereof, pivots on the upper ends of the arms slidably supported in said guideways, said pivots providing part of the support for the step in its unfolded operative position at the front end of the guideways and also providing part of the support for the step in its folded inoperative position, said pivots in the latter position of the step being disposed in the rear ends of said guideways, means engaged by the upper ends of said arms when the pivots are in the front ends of the guideways, whereby to support the step rigidly in relation to the brackets in operative position, the front ends of said guideways being offset downwardly and the pivots on the upper ends of the arms being arranged to engage in said offset ends to lock the step detachably in operative position, and means on the brackets in spaced relation to the offset ends of said guideways arranged to be engaged by the upper ends of said arms when they are folded into the plane of the brackets to cause the pivots to be raised out of the offset ends of the guideways into alignment with the rest of the guideways so as to permit sliding of the step to an out-of-the-way position.

9. A device as set forth in claim 2 wherein the inner end of at least one of the slots is offset downwardly for releasable locking engagement therein of the associated pivot to retain the folded step in the out-of-the-way position.

10. A device as set forth in claim 2 wherein the inner end of at least one of the slots is offset downwardly for releasable locking engagement therein of the associated pivot to retain the folded step in the out-of-the-way position, and spring means active against the step in the folded position to urge the pivot downwardly in the offset.

11. In a foldable step, a pair of upright guiding and supporting brackets each longitudinally slotted and having an inturned right angle perforated flange thereon for securing the same to a support, a step comprising a tread pivoted between opposed supporting arms on the ends thereof to fold into the plane of the arms, means on the arms slidably engaging in the slots in the brackets for sliding pivotal movement of said arms to and from an operative position extending in angular relation to the outer ends of said brackets, means on the pivoted ends of said arms for engagement with the bottom surfaces of said flanges in the operative position of the arms for supporting the latter against turning out of said position, said arms and tread member in folded position being disposed substantially wholly between the brackets in coplanar relation therewith, and an enclosing casing comprising a container having side, back, and bottom walls for enclosure of the aforesaid structure, the side walls having inwardly bent perforated top flanges for abutment on top of the flanges on said brackets and registration of their perforations with the perforations therein, fastener means entered through the registering perforations for securing the step structure and container therefor jointly to the support, and an openable closure for the front end of said container.

12. In a foldable step structure comprising a tread member invertible from a normal horizontal operative position and adapted when so inverted to be moved to and from an out-of-the-way position, the tread member being of sheet metal construction and having a longitudinal reenforcing flange on the inner edge thereof projecting downwardly from the top tread surface, a mud scraper for said tread comprising an integrally bent portion of said flange bent outwardly from the lower edge thereof and upwardly to provide a scraping edge, whereby when the tread is inverted, the scraper is also inverted substantially as and for the purpose described.

13. In a foldable step structure comprising a tread member invertible from a normal horizontal operative position and adapted when so inverted to be moved to and from an out-of-the-way position, the tread member being of sheet metal construction and having a longitudinal reenforcing flange on the inner edge thereof projecting downwardly from the top tread surface, a mud scraper for said tread comprising an integrally bent portion of said flange bent outwardly from the lower edge thereof and upwardly to provide a scraping edge, whereby when the tread is inverted, the scraper is also inverted substantially as and for the purpose described, an intermediate longitudinally extending portion of said upwardly bent flange being bent outwardly out of the plane of the scraper and formed so that it is connected only at its ends with the scraper portion of the flange to serve as a handle.

14. A shiftable step structure of the character described comprising a pair of laterally spaced elongated, substantially vertical brackets both of which have substantially horizontal longitudinal slots provided therein, a step comprising a tread member having a pair of supporting arms at opposite ends thereof extending therefrom to the brackets, each of said arms being disposed alongside one of said brackets, pivots on said arms slidably engaged in the longitudinal slots in said brackets to pivotally and slidably connect the step to the brackets for movement to and from retracted inoperative position between the brakets, both of said brackets having lateral projections on the top thereof substantially horizontally disposed, and both of said arms having the pivoted ends thereof cut off substantially horizontally in upwardly spaced relation to the pivots for engagement with said projections whereby to support the tread member in substantially horizontal extended operative position.

15. A step structure as set forth in claim 14 wherein each of said brackets has a lateral projection provided thereon at the bottom thereof for engagement with the arms of the step in retracted, substantially horizontal inoperative position for support thereof.

16. A step structure as set forth in claim 14 including means rigid with each of said brackets for preventing rearward displacement of said arms from extended operative position when the pivots thereon are in the outer ends of the longitudinal slots in said brackets.

17. A foldable step structure comprising a pair of laterally spaced substantially vertical sheet metal supporting brackets, each having an inturned top flange for fastening the same to a support, both brackets having substantially horizontal longitudinal slots provided therein, a step comprising a tread member, and a pair of supporting arms pivotally connected to the opposite ends thereof, the tread being foldable from an operative position in angular relation to said arms to an inoperative position between and in substantially the same plane with said arms, and pivots for the free ends of said arms slidably received in the slots in said brackets, the arms being disposed adjacent the inner sides of said brackets, the free ends of said arms in operative position being cut off substantially horizontally in upwardly spaced relation to said pivots and arranged to engage the inturned top flanges of said brackets to support the arms in angular relation to the brackets, the arms being foldable from operative position into the plane of the brackets and slidable lengthwise relative to the slots to an out-of-the-way position.

18. A device of the character described comprising two parallel laterally spaced elongated sheet metal brackets, each having a longitudinal slot provided therein, and a step adapted to be supported on said brackets comprising a tread member in a substantially horizontal plane parallel with the plane of said slots, and two parallel arms at opposite ends of said tread member extending in angular relation to said tread member toward the brackets for operation therebetween, each alongside one of said brackets, the upper ends of said arms being formed to provide substantially horizontal supporting surfaces substantially parallel with the aforesaid slots and tread member, studs on said arms extending through said slots pivotally securing the arms to said brackets for sliding and pivotal movement relative thereto, said studs being located in downwardly spaced relation to said top surfaces on said arms, and means in rigid relation with the brackets above the slots therein providing substantially horizontal supporting surfaces for engagement with the top supporting surfaces on said arms.

19. A device of the character described comprising two parallel laterally spaced elongated sheet metal brackets, each having a longitudinal slot provided therein, and a step adapted to be supported on said brackets comprising a tread member in a substantially horizontal plane parallel with the plane of said slots, and two parallel arms at opposite ends of said tread member extending in angular relation to said tread member toward the brackets for operation therebetween, each alongside one of said brackets, the upper ends of said arms being formed to provide substantially horizontal supporting surfaces substantially parallel with the aforesaid slots and tread member, studs on said arms extended through said slots pivotally securing the arms to said brackets for sliding and pivotal movement relative thereto, said studs being located in downwardly spaced relation to said top surfaces on said arms, means in rigid relation with the brackets providing substantially horizontal supporting surfaces at the tops thereof for engagement with the top supporting surfaces on said arms, and means to prevent rearward sliding movement of the arms relative to the brackets when the studs are in the front ends of the slots with the step in extended operative position.

20. A device of the character described comprising two parallel laterally spaced elongated sheet metal brackets, each having a longitudinal slot provided therein, and a step adapted to be supported on said brackets comprising a tread member in a substantially horizontal plane parallel with the plane of said slots, and two parallel arms at opposite ends of said tread member extending in angular relation to said tread member toward the brackets for operation therebetween, each alongside one of said brackets, the upper ends of said arms being formed to provide substantially horizontal supporting surfaces substantially parallel with the aforesaid slots and tread member, studs on said arms extended through said slots pivotally securing the arms to said brackets for sliding and pivotal movement relative thereto, said studs being located in downwardly spaced relation to said top surfaces on said arms, means in rigid relation with the brackets providing substantially horizontal supporting surfaces at the tops thereof for engagement with the supporting surfaces on said arms, means to prevent rearward sliding movement of the arms relative to the brackets when the studs are in the front ends of the slots with the step in extended operative position, and means for preventing forward sliding movement of the arms relative to the brackets when the studs are in the rear ends of the slots with the step in retracted inoperative position.

21. A device of the character described comprising two parallel laterally spaced elongated sheet metal brackets each having a longitudinal slot provided therein, and a step adapted to be supported on said brackets comprising a tread member in a substantially horizontal plane parallel with the plane of said slots, and two parallel arms at opposite ends of said tread member extending in angular relation to said tread member toward the brackets for operation therebetween, each alongside one of said brackets, the upper ends of said arms being formed to provide substantially horizontal supporting surfaces substantially parallel with the aforesaid slots and tread member, studs on said arms extended through said slots pivotally securing the arms to said brackets for sliding and pivotal movement relative thereto, said studs being located in downwardly spaced relation to said top surfaces on said arms, means in rigid relation with the brackets providing substantially horizontal supporting surfaces at the tops thereof for engagement with the supporting surfaces on said arms, and means for preventing forward sliding movement of the arms relative to the brackets when the studs are in the rear ends of the slots with the step in retracted inoperative position.

GILBERT LINSTEAD.
CHARLES R. POLSTRA.

CERTIFICATE OF CORRECTION.

Patent No. 2,153,946. April 11, 1939.

GILBERT LINSTEAD, ET AL.

It is hereby certified that error appears in the printed specification of the above numbered patent requiring correction as follows: Page 3, first column, lines 14 and 28-29, claim 1, for the word "retractive" read retracted; same page, second column, line 53, claim 7, for "spaced from" read on; line 54, same claim, for "on" read spaced from; page 4, second column, line 41, claim 14, for "brakets" read brackets; and that the said Letters Patent should be read with this correction therein that the same may conform to the record of the case in the Patent Office.

Signed and sealed this 15th day of August, A. D. 1939.

Leslie Frazer (Seal) Acting Commissioner of Patents.